United States Patent
Engelko et al.

(10) Patent No.: US 9,519,663 B2
(45) Date of Patent: Dec. 13, 2016

(54) UPGRADING AND MIGRATING A DATABASE BY A MIGRATION TOOL

(71) Applicants: Andrey Engelko, Bad Schoenborn (DE); Christian Fiderer, Plankstadt (DE)

(72) Inventors: Andrey Engelko, Bad Schoenborn (DE); Christian Fiderer, Plankstadt (DE)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 13/927,669

(22) Filed: Jun. 26, 2013

(65) Prior Publication Data
US 2015/0006476 A1    Jan. 1, 2015

(51) Int. Cl.
G06F 17/00    (2006.01)
G06F 17/30    (2006.01)

(52) U.S. Cl.
CPC ................... *G06F 17/303* (2013.01)

(58) Field of Classification Search
CPC .............. G06F 17/303; G06F 17/30079; G06F 17/30371; G06F 3/0647; G06F 17/30575
See application file for complete search history.

(56) References Cited

U.S. PATENT DOCUMENTS

| | | | |
|---|---|---|---|
| 7,171,432 B2 | 1/2007 | Wildhagen et al. | |
| 7,461,097 B2 | 12/2008 | Stahl et al. | |
| 7,917,607 B2 | 3/2011 | Becker et al. | |
| 7,933,869 B2 | 4/2011 | Becker et al. | |
| 8,200,634 B2 | 6/2012 | Driesen et al. | |
| 8,230,416 B2 | 7/2012 | Ivanov | |
| 8,326,800 B2 | 12/2012 | Cunningham et al. | |
| 8,356,010 B2 | 1/2013 | Driesen | |
| 8,412,739 B2 | 4/2013 | Engelko et al. | |
| 8,479,187 B2 * | 7/2013 | Driesen | G06F 8/65 717/168 |
| 2003/0130985 A1 | 7/2003 | Driesen et al. | |
| 2003/0172054 A1 * | 9/2003 | Berkowitz et al. | 707/1 |
| 2004/0122865 A1 * | 6/2004 | Stahl | G06F 17/303 |
| 2008/0243949 A1 * | 10/2008 | Anguelov | 707/204 |
| 2009/0320045 A1 | 12/2009 | Griffith et al. | |
| 2010/0153341 A1 * | 6/2010 | Driesen et al. | 707/661 |
| 2012/0041933 A1 * | 2/2012 | Driesen | 707/702 |
| 2012/0041988 A1 | 2/2012 | Driesen | |
| 2012/0166393 A1 | 6/2012 | Hoprich et al. | |
| 2012/0239616 A1 * | 9/2012 | Cunningham et al. | 707/620 |
| 2012/0265726 A1 * | 10/2012 | Padmanabhan et al. | 707/602 |
| 2012/0284234 A1 | 11/2012 | Mashtizadeh et al. | |
| 2013/0311520 A1 * | 11/2013 | Nakagawa | 707/812 |
| 2014/0025704 A1 * | 1/2014 | Jin et al. | 707/770 |

* cited by examiner

*Primary Examiner* — Angelica Ruiz
(74) *Attorney, Agent, or Firm* — Fish & Richardson P.C.

(57) ABSTRACT

Techniques for upgrading and migrating software systems include configuring a target database on a computing appliance that is communicably coupled with a distributed computing environment that includes a source database, the source database including a plurality of productive database tables and a plurality of non-productive database tables; determining a distribution of database tables to migrate to the target database, the distribution including at least a portion of the plurality of productive and non-productive database tables from the source database and at least one new database table of a database upgrade; migrating the distribution of database tables to the target database; and pointing a productive system of the distributed computing environment to the target database.

17 Claims, 3 Drawing Sheets

UPGRADING AND MIGRATING A DATABASE BY A MIGRATION TOOL

TECHNICAL BACKGROUND

This disclosure relates to upgrading and migrating systems and, more particularly, to automatically upgrading and migrating software systems with varying versions of software to a different database.

BACKGROUND

Software systems often require extensive maintenance throughout the lifecycle of the system. Maintenance can include different activities, such as database migration or unicode conversion. Currently each of such maintenance events must be performed in a separate project using different migration tools, involving different experts and project setups, which may complicate the maintenance efforts. Moreover in some cases the execution of the overall procedure may require the purchase of additional intermediate hardware resources, therefore increasing the overall cost of the migration. The complex requirements and efforts imposed by current migration tools can make some customers decide against the purchase and test of a new database.

Additionally, the migration tools modify the existent system to make it compatible with the new database. The modification of the system can create incompatibilities with the initial database, which generates long downtime intervals of the productive system being maintained. In case of an error, the system can be restored from backup. Consequently, another concern is that upgrades and migration of the system cannot be performed at any time. Instead, the migration of systems using current tools is preferably performed during downtimes, while mission-critical time periods of system use are preferably excluded. Any unexpected interruption of the migration procedure can ruin the downtime management of the customer. In addition, system inconsistencies caused by errors in the delivery of the upgrade or migration cannot be prevented proactively due to the complexity and the number of tools currently used for migration.

SUMMARY

The present disclosure relates to computer-implemented methods, computer-readable media, and computer systems for upgrading and migrating software systems One computer-implemented method includes configuring a target database on a computing appliance that is communicably coupled with a distributed computing environment that includes a source database, the source database including a plurality of productive database tables and a plurality of non-productive database tables; determining a distribution of database tables to migrate to the target database, the distribution including at least a portion of the plurality of productive and non-productive database tables from the source database and at least one new database table of a database upgrade; migrating the distribution of database tables to the target database; and pointing a productive system of the distributed computing environment to the target database.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In a first aspect combinable with any of the implementations, the target database includes an in-memory database.

In a second aspect combinable with any of the previous aspects, migrating the distribution of database tables to the target database includes performing an uptime migration of the plurality of non-productive database tables and the at least one new database table of the database upgrade to the target database.

In a third aspect combinable with any of the previous aspects, performing an uptime migration of the at least one new database table of the database upgrade includes copying the at least one new database table of the database upgrade from a shadow system of the distributed computing environment to the target database.

In a fourth aspect combinable with any of the previous aspects, migrating the distribution of database tables to the target database further includes performing a downtime migration of the plurality of productive database tables from the source database to the target database.

A fifth aspect combinable with any of the previous aspects further includes determining a downtime of the source database, the downtime including a time duration in which the plurality of productive database tables remain substantially unchanged; and performing the downtime migration during the downtime of the source database.

In a sixth aspect combinable with any of the previous aspects, determining a distribution of database tables to migrate to the target database includes calculating, on the source database, a plurality of SQL statements that determine the distribution of the portion of the plurality of productive and non-productive database tables; and executing, on the target database, the calculated plurality of SQL statements to initiate the migration.

A seventh aspect combinable with any of the previous aspects further includes maintaining, subsequent to the migration, the source database in a substantially static condition; identifying an error in the target database that includes the migrated distribution of database tables; and based on the identified error, moving the pointer from the target database to the maintained source database.

Various implementations of techniques for upgrading and migrating a system as described in the present disclosure may include none, one, some, or all of the following features. For example, the system migration can be performed automatically, without requiring particular knowledge from a user. The automatic migration of the system may minimize, if not substantially prevent, inconsistencies in the system through error corrections, thereby minimizing stopped processes in a productive environment of the software system. The migration tool may also facilitate performance improvements without extending the downtime by manual interaction from a user. The migration tool may modify the systems outside the source database, which limits the system downtime during migration, making the system downtime predictable. The techniques for upgrading and migrating a system can include all necessary tools, without requiring the purchase of other tools, making the migration cost predictable.

Various implementations of techniques for upgrading and migrating a system as described in the present disclosure may include none, one, some, or all of the following features. For example, such techniques may facilitate a life cycle management procedure which combines a system upgrade (e.g., release upgrade, enhancement package installation or installation of support package stack) with database migration in one integrated end-to-end process (e.g., allows changing of the system's database during the execution of upgrade). Also, such techniques may facilitate Unicode conversion or de-clustering during the upgrade and migration. Further, such techniques may eliminate a sequential (e.g., consisting of two or more steps) upgrade and migration that uses different tools, and includes two different technical and business downtimes, and often requires intermediate systems and/or additional software licenses. As another example, such techniques may include system cool down and warm up and testing of the target software, which may be executed only once in the migration-upgrade. Also, such techniques may provide a basis for further reduction of the downtime using, for example, change recording and reply methods. As a further example, such techniques may not modify an original system and thus, allows an immediate failover to the original system in case of errors during the system upgrade-migration. The upgrade-migration techniques may also update the system software and database content to the desired new release during the migration.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
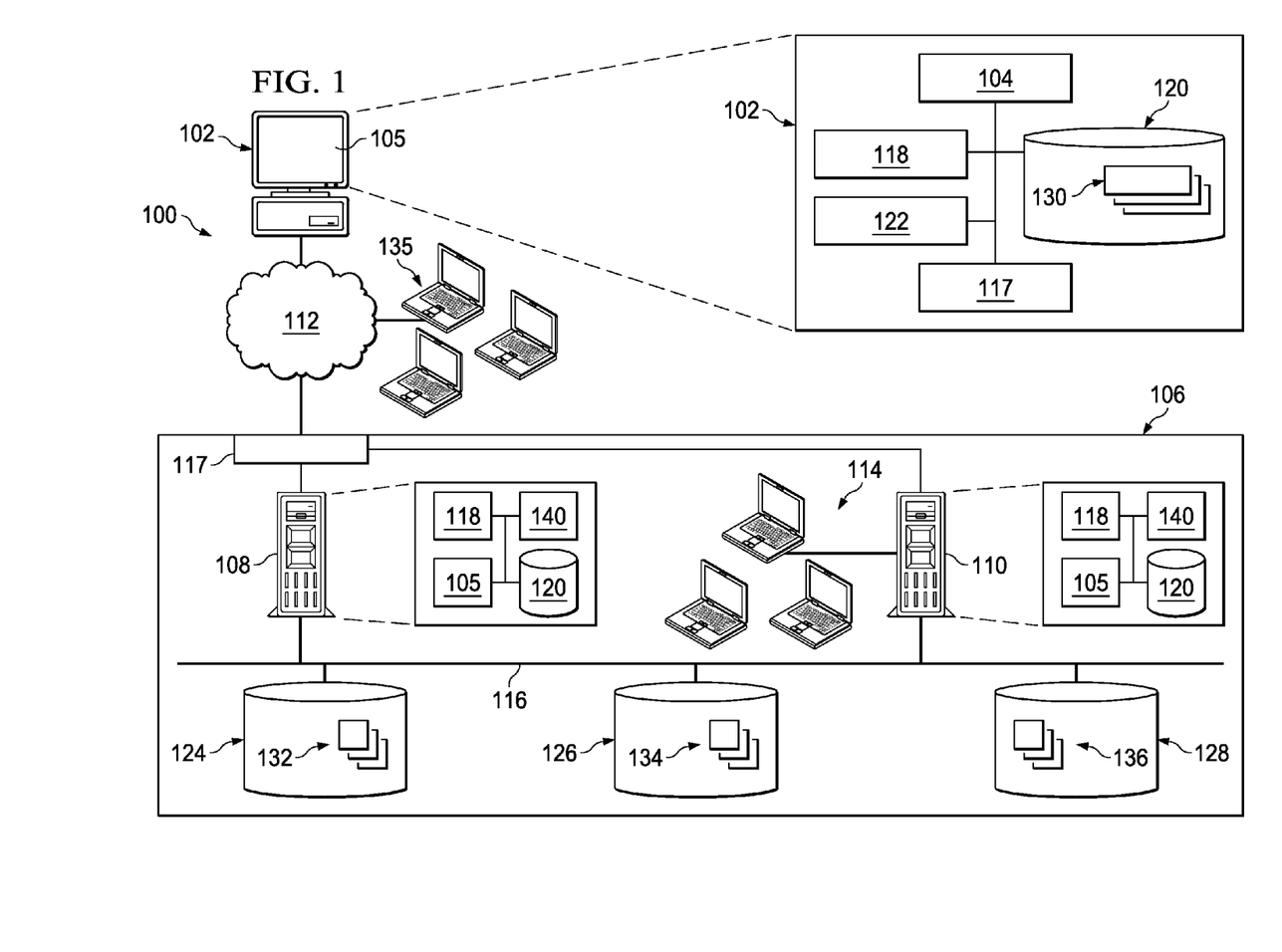
FIG. 1 illustrates one embodiment of a distributed computing system including a business enterprise system executing an enterprise software application.

FIG. 1 illustrates an example distributed computing system 100 for upgrading and migrating a database of an enterprise system. The illustrated distributed computing system 100 includes or is communicably coupled with server 102 and one or more enterprise systems, such as the illustrated enterprise system 106, at least some of which communicate across network 112. In general, distributed computing system 100 depicts an example configuration of a system capable of upgrading and migrating (e.g., substantially simultaneously) an enterprise software system with a migration tool 104. In some aspects, the migration tool 104 may facilitate and/or perform one or more operations for upgrading and migrating a database of an enterprise system. For example, the migration tool 104, stored in the memory 120, can retrieve a source database 124, configure a target database 128 on a computing appliance that is communicably coupled with the memory 120 and migrate a distribution of database tables from the source database 124 to the target database.

The distributed computing system 100 also supports one or more servers 102 (e.g., servers located at, or controlled by or under the direction of a software provider or software servicer) operable to provide a set of services to the enterprise system 106 in which the one or more servers can be logically grouped and accessible within a cloud computing network. Accordingly, a unified runtime framework and graphical, process-centric user interface may be provided to an enterprise system 106 or server 102 as an on-demand solution through the cloud computing network or as a traditional server-client system.

The enterprise system 106, at a high level, includes a development system 108 and a productive system 110 communicably coupled to the network 112 (and thus the server 102 and other servers and, possibly, other enterprise systems) through an interface 117. In some embodiments, the enterprise system 106 may include additional systems besides the development system 108 and the productive system 110, such as, for example, a quality assurance system (not shown here). Moreover, in some embodiments, the development system 108 may include all or a portion of such a quality assurance system, which, in some aspects, may perform and/or facilitate quality assurance testing on any changes to software on or associated with the enterprise system 106.

As described in more detail below, the enterprise system 106 also includes a source database 124, a shadow database 126, and a target database 128 communicably coupled to each development system 108 and productive system 110 through a network 116. More specifically, each development system 108 and/or productive system 110 within the enterprise system 106 may have access to the source database 124, the shadow database 126, and the target database 128.

The server 102, generally, is any server that stores one or more hosted applications 122, where at least a portion of the hosted applications 122 are executed via requests and responses sent to users or clients within and communicably coupled to the illustrated distributed computing system 100 of FIG. 1. In some instances, the server 102 may store a plurality of various hosted applications 122, while in other instances, the server 102 may be a dedicated server meant to store and execute only a single hosted application 122 or other applications. In some instances, the server 102 may comprise a web server or be communicably coupled with a web server, where the hosted applications 122 represent one or more web-based applications accessed and executed via network 112 by the enterprise system 106 to perform the programmed tasks or operations of the hosted application 122.

At a high level, the server 102 comprises an electronic computing device operable to receive, transmit, process, store, or manage data and information associated with the distributed computing system 100. The server 102 illustrated in FIG. 1 can be responsible for receiving application requests from one or more software applications on or associated with the enterprise system 106, such as an database migration upgrade application 140 or other or business applications associated with additional enterprise systems of distributed computing system 100, and responding to the received requests by processing said requests in the associated hosted application 122, and sending the appropriate response from the hosted application 122 back to the requesting database migration upgrade application 140. Alternatively, the hosted application 122 at server 102 can be capable of processing and responding to local requests from a user accessing server 102 locally. Accordingly, in addition to requests from the enterprise system 106 illustrated in FIG. 1, requests associated with the hosted applications 122 may also be sent from internal users, external or third-party customers, other automated applications, as well as any other appropriate entities, individuals, systems, or computers. Further, the terms "enterprise application" and "business application" may be used interchangeably as appropriate without departing from the scope of this disclosure.

As used in the present disclosure, the term "computer" is intended to encompass any suitable processing device. For example, although FIG. 1 illustrates a single server 102, distributed computing system 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

The interface 117 is used by the server 102 for communicating with other systems in a client-server or other distributed environment (including within distributed computing system 100) connected to the network 112 (e.g., enterprise system 106, as well as other systems communicably coupled to the network 112). Although FIG. 1 depicts a server-client environment, other implementations of the runtime environment for testing one or more CUT modules utilizing the migration tool 104 and one or more test seams. For example, the runtime environment may be provided or accessed locally at a computer. Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated distributed computing system 100.

Generally, example server 102 may be communicably coupled with a network 112 that facilitates wireless or wireline communications between the components of the distributed computing system 100 (i.e., between the server 102 and enterprise system 106 as well as other enterprise systems), as well as with any other local or remote computer, such as additional clients, servers, or other devices communicably coupled to network 112 but not illustrated in FIG. 1. In the illustrated environment, the network 112 is depicted as a single network in FIG. 1, but may be comprised of more than one network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the enterprise system 106 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated distributed computing system 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

In the illustrated implementation, and as shown in FIG. 1, each of the server 102, the development system 108, and the productive system 110 include or are communicably coupled with a processor 118, an memory 120, and a Graphical User Interface (GUI) 105.

Each of the GUIs 105 comprise a graphical user interface operable to, for example, allow the user of the server 102 (or development system 108 or productive system 110) to interface with at least a portion of the platform for any suitable purpose, such as creating, preparing, requesting, or analyzing data, as well as viewing and accessing source documents associated with business transactions. Generally, the GUI 105 provides the particular user with an efficient and user-friendly presentation of business data provided by or communicated within the system. The GUI 105 may comprise a plurality of customizable frames or views having interactive fields, pull-down lists, buttons, and other controls operated by the user. For example, GUI 105 may provide interactive elements that allow a user to enter or select elements of business process instances in GUI 105. More generally, GUI 105 may also provide general interactive elements that allow a user to access and utilize various services and functions of hosted applications 122. The GUI 105 is often configurable, supports a combination of tables and graphs (bar, line, pie, status dials, etc.), and is able to build real-time portals, where tabs are delineated by key characteristics (e.g., site or micro-site). Therefore, the GUI 105 contemplates any suitable graphical user interface, such as a combination of a generic web browser, intelligent engine, and command line interface (CLI) that processes information in the platform and efficiently presents the results to the user visually.

Although illustrated as a single processor 118 in certain components shown in FIG. 1, two or more processors may be used according to particular needs, desires, or particular embodiments of distributed computing system 100. Each processor 118 may be a central processing unit (CPU), a blade, an application specific integrated circuit (ASIC), a field-programmable gate array (FPGA), or another suitable component. Generally, the processor 118 in the server 102 executes instructions and manipulates data to perform the operations of server 102 and, specifically, the one or more plurality of operations of the hosted application 122 and the migration tool 104. Specifically, the server's processor 118 executes the functionality required to receive and respond to requests from the enterprise system 106 and its respective business applications, such as business application 140, as well as the functionality required to perform the other operations of the hosted application 122. The processors 118 in the development system 108 and the productive system 110 execute instructions and manipulate data to perform the operations of the respective systems and, specifically, the one or more plurality of operations of the database migration upgrade application 140, as well as any other software.

Regardless of the particular implementation, "software" may include computer-readable instructions, firmware, wired or programmed hardware, or any combination thereof on a non-transitory, tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

At a high level, each of the one or more hosted applications 122, database migration upgrade application 140, and/or migration tool 104 is any application, program, module, process, or other software that may execute, change, delete, generate, or otherwise manage information according to the present disclosure. In certain cases, only one hosted application 122 may be located at a particular server 102. In others, a plurality of related and/or unrelated hosted applications 122 may be stored at a single server 102, or located across a plurality of other servers 102, as well. In certain cases, distributed computing system 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted application 122 and/or database migration upgrade application 140 may represent web-based applications accessed and executed by the enterprise system 106 via the network 112 (e.g., through the Internet). Further, while illustrated as internal to server 102 and the enterprise system 106, respectively, one or more processes associated with a particular hosted application 122 and/or database migration upgrade application 140 may be stored, referenced, or executed remotely. For example, a portion of a particular hosted application 122 and/or database migration upgrade application 140 may be a web service associated with the application that is remotely called, while another portion of the hosted application 122 and/or database migration upgrade application 140 may be an interface object or agent bundled for processing at a remote enterprise system 106. Moreover, any or all of the hosted applications 122 and/or database migration upgrade application 140 may be a child or sub-module of another software module without departing from the scope of this disclosure. Still further, portions of the hosted application 122 and/or database migration upgrade application 140 may be executed by a user working directly at server 102, as well as remotely at enterprise system 106.

As illustrated, processor 118 can also execute the migration tool 104. As explained more fully below, the migration tool 104, in some embodiments, may implement a systematic procedure to automatically apply one or more corrections to an upgrade and/or migrate to the enterprise software 140, thereby preventing inconsistencies and stopped processes and providing performance improvements without extending downtime of the database migration upgrade application 140.

In general, each component of the distributed computing system 100 (e.g., the server 102, the development system 108, and the productive system 110) includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122, as well as the development system 108 and productive system 110 and the database migration upgrade application 140.

In some implementations, the memory 120 may expose databases and capabilities to upgrade and migrate the databases. The memory 120 may reside on top of a computational engine (e.g., in the server appliance 102 or otherwise) that facilitates fast manipulations on large amounts of data and/or replication of entire databases. Thus, in some implementations, the in-memory database may provide for the following design principles/concepts: access and upgrade of data in real-time; a highly parallelized computational engine (e.g., for computationally intensive upgrades); close coupling of source databases and target databases (e.g., eliminating indexing and caching).

The illustrated memory 120 stores one or more data objects 130. The data objects 130 may include and/or reference a variety of objects that store and/or include business data. For instance, the data objects 130 may be source databases and target databases. The data objects 130, in some embodiments, may be delivered to the enterprise system 106 by the migration tool 104 in order to automatically update and/or upgrade the database migration upgrade application 140. Further, in some aspects, the data objects 130 may correct errors and/or issues with the database migration upgrade application 140, product errors, product modifications, product upgrades, consulting notes, customizing notes, program corrections, code corrections, methods for table/field additions, customization changes, and otherwise. In short, the data objects 130 may be applied to the code, data, objects, and other portions of the database migration upgrade application 140.

The productive system 110 of the enterprise system 106, as illustrated, includes one or more internal clients 114. Internal client 114 may be any computing device operable to connect to or communicate with the productive system 110 (or other system within the enterprise system 106 or computer or system external to the enterprise system 106) using a wireline or wireless connection. For example, internal clients 114 may be a part of the business enterprise that owns, controls, and/or operates the enterprise system 106 that operates and/or executes the database migration upgrade application 140 stored on or associated with the productive system 110. Further, while illustrated internal to the enterprise system 106, one or more internal clients 114 may be located external to the enterprise system 106. For example, distributed computing system 100, as illustrated, includes one or more external clients 135 communicably coupled to one or more of the server 102 and/or enterprise system 106 through network 112. External clients 135, in some aspects, may be clients not associated with, owned, or controlled by the business enterprise that controls, owns, and/or operates the enterprise system 106. Alternatively, external clients 135 may be similar to the internal clients 114 illustrated as internal to the enterprise system 106. In any event, there may also be one or more additional clients 135 (or 114) external to the illustrated portion of distributed computing system 100 that are capable of interacting with the distributed computing system 100 via the network 112. Further, the terms "client" and "user" may be used interchangeably as appropriate without departing from the scope of this disclosure. Moreover, while each internal client 114 and/or external client 135 is described in terms of being used by a single user, this disclosure contemplates that many users may use one computer, or that one user may use multiple computers.

As used in this disclosure, each of the development system 108, the productive system 110, and the clients 114 and 135 are intended to encompass a personal computer, touch screen terminal, workstation, server, network computer, kiosk, wireless data port, smart phone, personal data assistant (PDA), one or more processors within these or other devices, or any other suitable processing device. For example, each of the development system 108 and the productive system 110 may comprise a computer that includes an input device, such as a keypad, touch screen, mouse, or other device that can accept user information, and an output device that conveys information associated with the operation of the server 102 (and hosted application 122) or the enterprise system 106 itself, including digital data, visual information, or the database migration upgrade application 140. Both the input and output device may include fixed or removable storage media such as a magnetic storage media, CD-ROM, or other suitable media to both receive input from and provide output to users of enterprise system 106 through the display, namely, the GUIs 105.

As illustrated, the enterprise system 106 also includes a network 116 communicably coupling the development system 108, the productive system 110 (as well as other systems not shown) with the source database 124, the shadow database 126, and the target database 128. Alternatively, or in some preferred implementations, the source database 124, shadow database 126 and/or target database may be implemented as database schemas in the same database and, thus, the connection between these databases may not be over a network, such as network 116.

At a high level, the network 116 may be any communication mechanism to facilitate data transfer between the illustrated components of the enterprise system 106. For example, the network 116 may be all or a portion of an enterprise or secured network, while in another instance a connection to the Internet. In some instances, a portion of the network 116 may be a virtual private network (VPN) and can comprise either a wireline or wireless link. The network 116 may communicate, for example, Internet Protocol (IP) packets, Frame Relay frames, Asynchronous Transfer Mode (ATM) cells, voice, video, data, and other suitable information, such as, for example, the data objects 130, all or a portion of an updated or upgraded version of the database migration upgrade application 140, or other application. The network 116 may also include one or more local area networks (LANs), radio access networks (RANs), metropolitan area networks (MANs), wide area networks (WANs), all or a portion of the Internet, and/or any other communication system or systems at one or more locations.

The source database 124 can be communicably coupled to a particular one of the development system 108 or the productive system 110 through the network 116 or by other techniques. The source database 124, as illustrated, includes or stores source content 132. In some aspects, the source content 132 may be a current version of a software system, such as, for example, the database migration upgrade application 140 stored on and/or executed on the development system 108 and the productive system 110.

The shadow database 126 can also be communicably coupled to a particular one of the development system 108 or the productive system 110 through the network 116 or by other techniques. The shadow database 126, as illustrated, includes or stores shadow content 134. In some aspects, the shadow content 134 can be an update or upgrade to the current version of a software system located on the enterprise system 106, such as, for example, the database migration upgrade application 140. For example, in some embodiments, such as when the shadow content 134 is an upgrade to the database migration upgrade application 140, the shadow database 126 may be a fixed database delivered to the enterprise system 106, e.g., by DVD or other media. In some embodiments, such as when the shadow content 134 is an update to the database migration upgrade application 140, the shadow database 126 may be a clone of the source database 124.

The target database 128 can also be communicably coupled to a particular one of the development system 108 and or the productive system 110 (and other systems of the enterprise system 106) through the network 116 or by other techniques. The target database 128, as illustrated, includes or stores target content 136. In some aspects, the target content 136 may result from adding content (e.g., delta packages or other content) to the shadow content 134 in the shadow database 126. In some implementations, the target database 128 can be an in-memory database.

In any event, one or more of each of the source database 124, the shadow database 126, and the target database 128 can be any form or structure of data storage. For example, the repositories illustrated in FIG. 1 may be hardware storage locations and structure, such as servers, fixed or removable storage media such as a magnetic storage media, CD-ROM, or other suitable storage location.

While FIG. 1 is described as containing or being associated with a plurality of elements, not all elements illustrated within distributed computing system 100 of FIG. 1 may be utilized in each alternative implementation of the present disclosure. For example, although FIG. 1 depicts a server-client environment implementing a hosted application at server 102 that can be accessed by the enterprise system 106, in some implementations, server 102 executes a local application that features an application UI accessible to a user directly utilizing a GUI 105 at one or more of the external clients 135, the internal clients 114, or the development system 108 or productive system 110. Further, although FIG. 1 depicts a server 102 external to network 112, servers may be included within the network 112 as part of a cloud network solution, for example. Additionally, one or more of the elements described herein may be located external to distributed computing system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
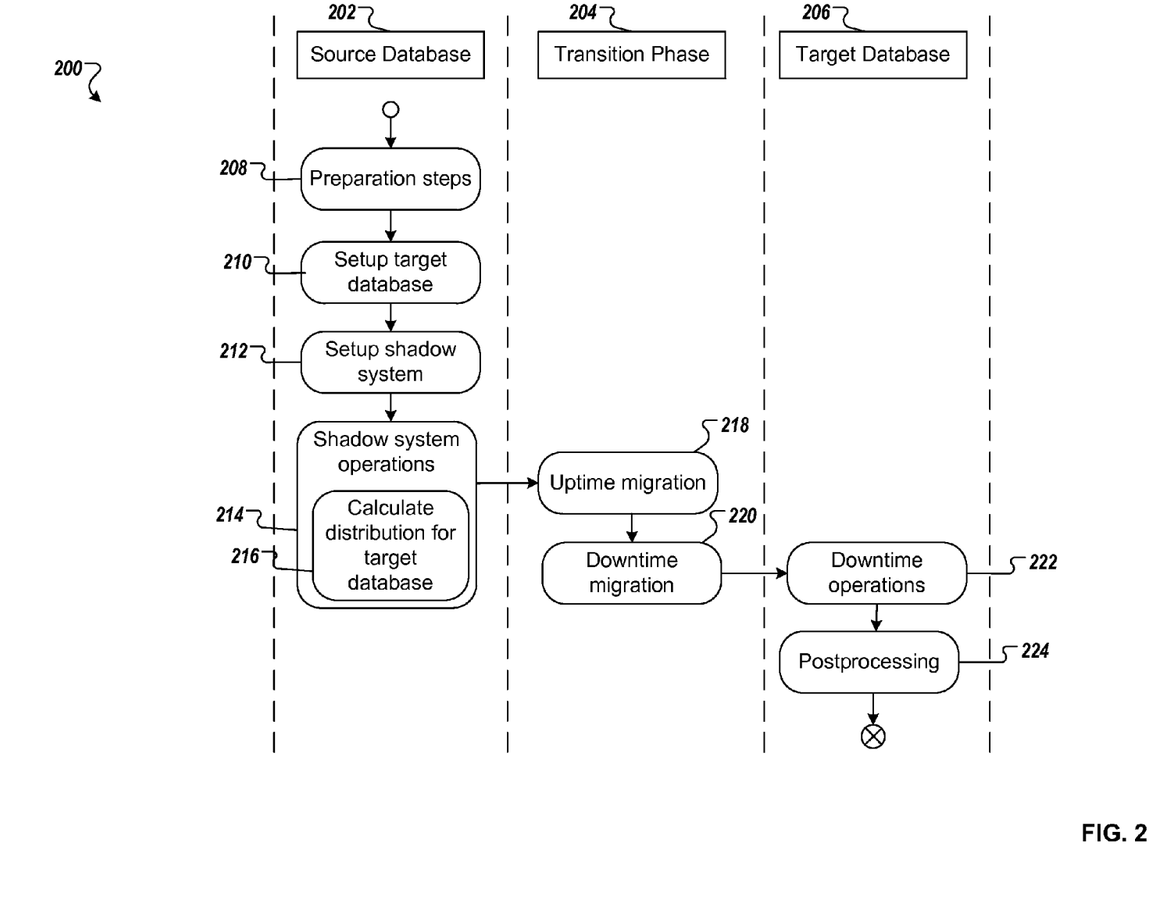
FIG. 2 illustrates a process diagram of an example process for upgrading and modifying an enterprise system by a migration tool.

FIG. 2 illustrates a process diagram of an example process 200 for upgrading and migrating an enterprise system by a migration tool. For example, process 200 may be implemented by the migration tool 104 on the distributed computing system 100 including the development system 108 and the productive system 110 of the enterprise environment 106, as described with reference to FIG. 1. Further, the process 200 may represent a migration process implementable by a migration tool, such as the migration tool 104.

As illustrated, process 200 can be performed as a set of sub-processes in a source database 202, outside the source database in a transition phase 204 and in a target database 206. The sub-processes (208, 210, 212, 214, and 216) performed by the migration tool within the source database 202 define an in-place migration upgrade procedure. Two sub-processes (218 and 220) are performed by the migration tool within the transition phase 204 (e.g., external to both the source database 124 and target database 128). One or more sub-processes (222 and 224) are performed by the migration tool within the target database 206.

Beginning with preparation steps 208, the migration tool can perform multiple sub-processes in the source database 202, some of those requiring input from the preparation steps 208. The preparation steps 208 can include authentication of migration tool deployment. For example, the migration tool can ask an administrator of the development and/or productive system for the credentials of the development user. The preparation steps 208 can also include the preparation of systems associated to migration. For example, the migration tool can identify the systems, retrieve information about each of the identified systems and determine the system changes associated with the upgrade. The preparation steps 208 can also include retrieval of information about the migration tools, configuration of deployment of the required database management system (DBMS) client software on the application server; configuration of the target database (e.g., identification of the users, schemas etc.) and configuration of the connections to the target DBMS (e.g., target database 206) from the application server (e.g., source database 202).

Continuing in the source database 202, the setup target database 210 can include verification of the target database 206. For example, the migration tool can verify if the target database 206 is accessible and includes a version compatible with the system to be migrated. The setup target database 210 can also include the setup of the connection with the target database 206.

Operations performed in and/or by the source database 202 may further include the setup of the shadow system 212. The setup of the shadow system 212 may depend on the way the upgrade is performed. In some implementations, the setup of the shadow system 212 is based on installation exports. For example, the setup of the shadow system 212 can include the use of a shadow database (e.g., a DVD) to import data to the shadow system. In some implementations, the setup of the shadow system 212 can be based on copying parts (e.g., one or more database tables or other components) of the source system in the shadow system.

Continuing in the source database 202, the shadow system operations 214 may include a plurality of actions directed towards upgrading the system, which are performed while the original system is running. For example, the shadow system operations 214 can selectively modify the data in the database, such that the changes do not produce a conflict with the productive system. In some implementations, the upgraded data is renamed. For example, the database table names can include the original names and an upgrade indicator (e.g., a "~" as suffix). The shadow system operations 214 can include calculation of distribution for target database 216. The calculation of distribution for target database 216 includes the calculation of the SQL statements required for the adjustment of the database tables. For example, the adjustment of the database tables can include addition of new columns and/or modifications of a column's data type. The calculations can be implemented in the source database 202 for being executed in the target database 206. A particular functionality can be implemented in a dictionary of the target database 206 to enable the execution in the target database 206.

Next, during the transition phase 204, the migration tool performs the execution of performance adjustments. The migration, as illustrated, can be grouped in two sub-processes: an uptime migration 218 and a downtime migration 220. In one or both of the uptime migration 218 and the downtime migration 220, data may be converted from non-unicode to unicode format and it can be de-clustered based on the data type. The data structures (e.g., database tables), which are not relevant for the productive operation of the system may be migrated during the uptime migration 218. The uptime migration 218 can include the exchange of data of the shadow system and addition of new data. For example, the exchange of data includes data prepared during the operation of the shadow system with the content of the new release. In some implementations, the exchange of data is based on a standard upgrade procedure. During the migration to the target database 206, the name of the upgraded data is reversed to its original format by deleting the upgrade indicator.

The uptime migration 218 can also include addition of an upgrade, such as new data to the target database 206. For example, new database tables can be safely copied during the production operation of the old system. In some implementations, other data can be migrated from the source database 202 to the target database 206 depending on the usage of possible downtime reduction methods.

Continuing in the transition phase 204, the migration tool may also perform a downtime migration 220. In some implementations, the downtime migration 220 includes removal of upgrade artifacts. The data handled during downtime migration 220 is the data upgraded in the source database 202 that is not migrated during the uptime migration 218. For example, data that is migrated during downtime migration 220 includes transactional data, forming the main amount of the overall data in the source database 202. The amount of data to be migrated during downtime migration 220 and the type of downtime operations 222 determine the duration of the overall downtime associated with the migration process 200.

Next, the migration tool performs two sub-processes in the target database 206: downtime operations 222 and post-processing 224. The downtime operations 222 include modification of data. In some examples, modification of data can include structural adjustment of data (e.g., addition or removal of cells, rows or columns of a tabular data type) used by the productive system. In some examples, modification of data can also include change of data types (e.g., from one format readable in the source database 202 to a format compatible with the target database 206). The downtime operations 222 can also include an import action, to add new data to the data retrieved from the source database 202. The downtime operations 222 can also include after-input methods and programs after input-methods that can be run during upgrade. In some implementations, the downtime operations 222 include a plurality of downtime reduction methods. For example, downtime reduction methods can be based on change recording, replay of previously executed processes, and/or other data specific methods.

Continuing in the target database 206, the migration tool performs the post-processing 224. In some implementations, the post-processing 224 includes a clean-up process. The clean-up process removes data that is not required by the target database 206, which was previously required by the source database 202 or was required by the migration tool to execute migration process 200.

Figure 3:
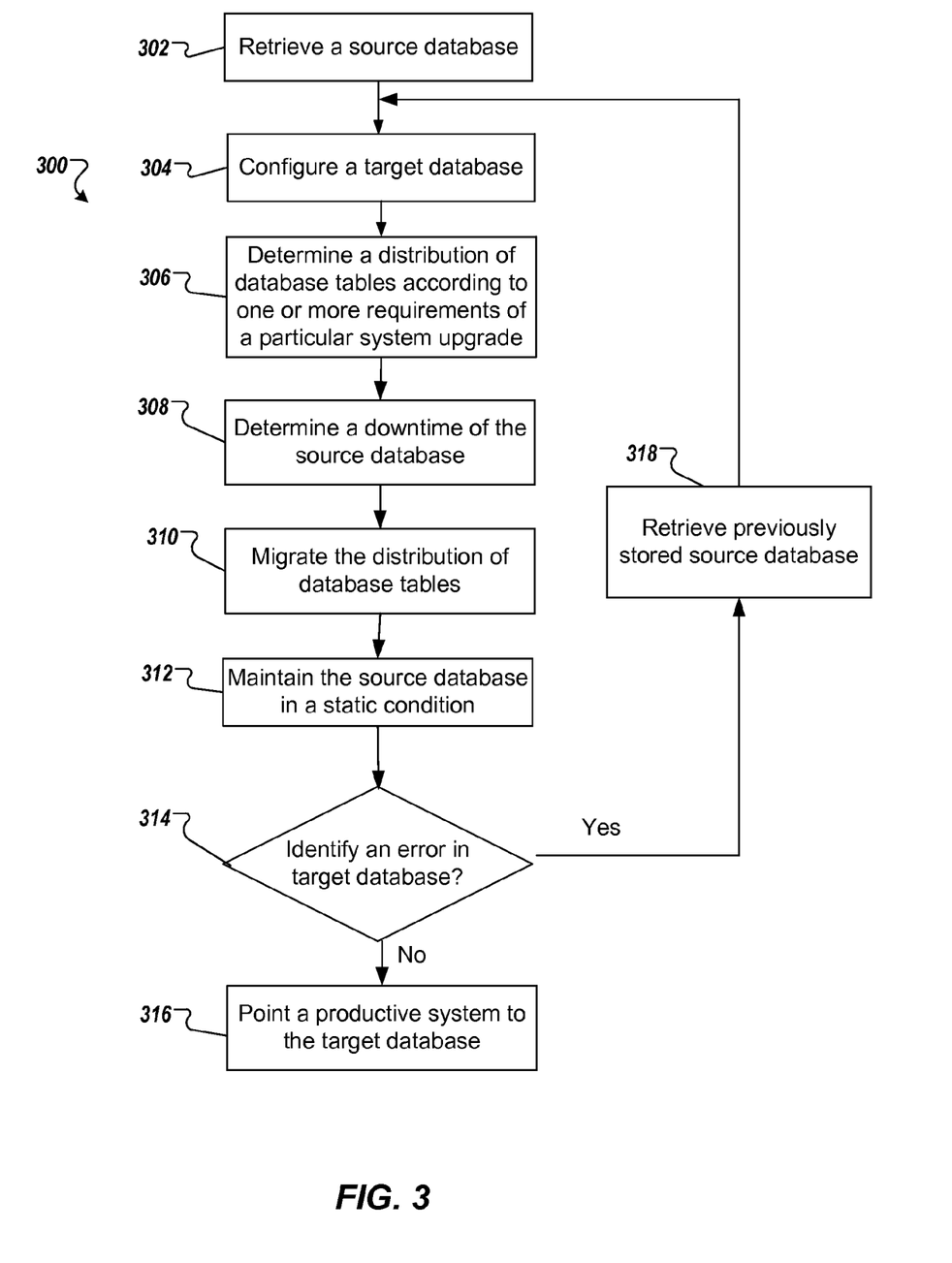
FIG. 3 illustrates a flowchart of an example method for upgrading and migrating an enterprise system by a migration tool according to the present disclosure.

FIG. 3 illustrates an example method 300 for managing an in-place database migration upgrade. For example, in some embodiments, method 300, when implemented, automatically performs a database migration upgrade, upon the approval of a user. In some embodiments, method 300 can be performed on any of the illustrated computing environments of FIGS. 1 and 2, as well as other appropriate computing environments. Method 300 can begin at step 302, when the server 102, retrieves a source database and generates a virtual workspace viewable by a user on a graphical user interface. The source database can include a plurality of productive database tables and a plurality of non-productive database tables.

In step 304, a target database is configured on a computing appliance that is communicably coupled with a distributed computing environment. The distributed computing environment can include the source database. In step 306, the distribution of database tables that will be migrated to the target database is determined according to one or more requirements of a particular system upgrade. The distribution includes at least a portion of the plurality of productive and non-productive database tables from the source database and at least one new database table of a database upgrade.

In step 308, a downtime of the source database is determined. The downtime includes a time duration, in which the plurality of productive database tables remains substantially unchanged. In step 310, the distribution of database tables is migrated to the target database. In some implementations, the migration includes performing an uptime migration of the plurality of non-productive database tables and the at least one new database table of the database upgrade to the target database. The uptime migration of the at least one new database table of the database upgrade can include copying the at least one new database table of the database upgrade from a shadow system of the distributed computing environment to the target database. In some implementations, the migration includes performing a downtime migration of the plurality of productive database tables from the source database to the target database.

In step 312, the source database is maintained in a substantially static condition. For example, a copy of the original source database can be stored in the memory 120, described with reference to FIG. 1. In step 314, the target database is verified to identify any error that could be associated with the migration of the distribution of database tables. In step 316, based on determining that the target database is free of errors, a productive system is pointed to the target database. Alternatively, in step 318, based on determining that the target database includes an error, the pointer is moved from the target database to the maintained source database. Upon retrieval of the previously stored source database, the steps 304 to 314 of method 300 for managing an in-place database migration upgrade can be repeated.

A number of embodiments have been described. Nevertheless, it will be understood that various modifications may be made. For instance, the illustrated steps of method 300 may be performed in different orders than those shown in FIG. 3. Further, one or more of the illustrated steps of method 300 may not be performed. One or more additional steps not illustrated herein may be implemented in some embodiments of method 300. In addition, other methods related to the form transformation module according to the present disclosure may be implemented. Accordingly, other embodiments are within the scope of the following claims.

What is claimed is:

1. A computer-implemented method of managing an in-place database migration upgrade, comprising:
    configuring a target database on a computing appliance that is communicably coupled with a distributed computing environment that comprises a source database, the source database comprising a plurality of productive database tables and a plurality of non-productive database tables;
    determining a distribution of database tables to migrate to the target database, the distribution comprising at least a portion of the plurality of productive and non-productive database tables from the source database and at least one new database table of a database upgrade;
    providing one or more configurations of a shadow database that comprises one of a fixed database or a clone of the source database;
    calculating a plurality of SQL statements that identify an adjustment of the portion of the plurality of productive and non-productive database tables;
    implementing the calculation of the plurality of SQL statements in the source database for execution in the target database;
    based on the implementation, performing:
        i) an uptime migration of the plurality of non-productive database tables and the at least one new database table to the target database, wherein the uptime migration comprises copying at least a portion of the shadow database to the target database based on the shadow database comprising one of a fixed database or a clone of the source database, and
        ii) a downtime migration of the plurality of productive database tables to the target database,
        wherein the uptime and the downtime migration is performed external to both the source database and the target database; and
    pointing a productive system of the distributed computing environment to the target database.

2. The computer-implemented method of claim 1, wherein the target database comprises an in-memory database.

3. The computer-implemented method of claim 1, wherein performing an uptime migration of the at least one new database table of the database upgrade comprises copying the at least one new database table of the database upgrade from the shadow system of the distributed computing environment to the target database.

4. The computer-implemented method of claim 1, further comprising:
    determining a downtime of the source database, the downtime comprising a time duration in which the plurality of productive database tables remain substantially unchanged; and
    performing the downtime migration during the downtime of the source database.

5. The computer-implemented method of claim 1, further comprising:
maintaining, subsequent to the migration, the source database in a substantially static condition;
identifying an error in the target database that comprises the migrated distribution of database tables; and
based on the identified error, moving the pointer from the target database to the maintained source database.

6. The computer-implemented method of claim 1, wherein the uptime and the downtime migration is performed at a shadow database that is external to both the source database and the target database.

7. The computer-implemented method of claim 1, wherein the adjustment includes at least one of an addition of new columns to the plurality of productive and non-productive database tables and modification to data type of one or more columns of the plurality of productive and non-productive database tables.

8. A computer program product for managing an in-place database migration upgrade, the computer program product comprising computer readable instructions embodied on tangible, non-transitory media that are executable to perform operations comprising:
configuring a target database on a computing appliance that is communicably coupled with a distributed computing environment that comprises a source database, the source database comprising a plurality of productive database tables and a plurality of non-productive database tables;
determining a distribution of database tables to migrate to the target database, the distribution comprising at least a portion of the plurality of productive and non-productive database tables from the source database and at least one new database table of a database upgrade;
providing one or more configurations of a shadow database that comprises one of a fixed database or a clone of the source database;
calculating a plurality of SQL statements that identify an adjustment of the portion of the plurality of productive and non-productive database tables;
implementing the calculation of the plurality of SQL statements in the source database for execution in the target database;
based on the implementation, performing:
i) an uptime migration of the plurality of non-productive database tables and the at least one new database table to the target database, wherein the uptime migration comprises copying at least a portion of the shadow database to the target database based on the shadow database comprising one of a fixed database or a clone of the source database, and
ii) a downtime migration of the plurality of productive database tables to the target database,
wherein the uptime and the downtime migration is performed external to both the source database and the target database; and
pointing a productive system of the distributed computing environment to the target database.

9. The computer program product of claim 8, wherein the target database comprises an in-memory database.

10. The computer program product of claim 8, wherein performing an uptime migration of the at least one new database table of the database upgrade comprises copying the at least one new database table of the database upgrade from the shadow system of the distributed computing environment to the target database.

11. The computer program product of claim 8, wherein the operations further comprise:
determining a downtime of the source database, the downtime comprising a time duration in which the plurality of productive database tables remain substantially unchanged; and
performing the downtime migration during the downtime of the source database.

12. The computer program product of claim 8, wherein the operations further comprise:
maintaining, subsequent to the migration, the source database in a substantially static condition;
identifying an error in the target database that comprises the migrated distribution of database tables; and
based on the identified error, moving the pointer from the target database to the maintained source database.

13. A system of one or more computers configured to perform operations comprising:
configuring a target database on a computing appliance that is communicably coupled with a distributed computing environment that comprises a source database, the source database comprising a plurality of productive database tables and a plurality of non-productive database tables;
determining a distribution of database tables to migrate to the target database, the distribution comprising at least a portion of the plurality of productive and non-productive database tables from the source database and at least one new database table of a database upgrade;
providing one or more configurations of a shadow database that comprises one of a fixed database or a clone of the source database;
calculating a plurality of SQL statements that identify an adjustment of the portion of the plurality of productive and non-productive database tables;
implementing the calculation of the plurality of SQL statements in the source database for execution in the target database;
based on the implementation, performing:
i) an uptime migration of the plurality of non-productive database tables and the at least one new database table to the target database, wherein the uptime migration comprises copying at least a portion of the shadow database to the target database based on the shadow database comprising one of a fixed database or a clone of the source database, and
ii) a downtime migration of the plurality of productive database tables to the target database,
wherein the uptime and the downtime migration is performed external to both the source database and the target database; and
pointing a productive system of the distributed computing environment to the target database.

14. The system of claim 13, wherein the target database comprises an in-memory database.

15. The system of claim 13, wherein performing an uptime migration of the at least one new database table of the database upgrade comprises copying the at least one new database table of the database upgrade from the shadow system of the distributed computing environment to the target database.

16. The system of claim 13, wherein the operations further comprise:

determining a downtime of the source database, the downtime comprising a time duration in which the plurality of productive database tables remain substantially unchanged; and performing the downtime migration during the downtime of the source database.

17. The system of claim 13, wherein the operations further comprise:

maintaining, subsequent to the migration, the source database in a substantially static condition;

identifying an error in the target database that comprises the migrated distribution of database tables; and based on the identified error, moving the pointer from the target database to the maintained source database.

* * * * *